United States Patent
Folco et al.

(10) Patent No.: US 10,169,104 B2
(45) Date of Patent: Jan. 1, 2019

(54) VIRTUAL COMPUTING POWER MANAGEMENT

(71) Applicant: International Business Machines Corporation, Armonk, NY (US)

(72) Inventors: Rafael C. S. Folco, Santa Barbara d'Oeste (BR); Breno H. Leitao, Campinas (BR); Thiago C. Rotta, Campinas (BR); Tiago N. Santos, Araraquara (BR)

(73) Assignee: International Business Machines Corporation, Armonk, NY (US)

(*) Notice: Subject to any disclaimer, the term of this patent is extended or adjusted under 35 U.S.C. 154(b) by 178 days.

(21) Appl. No.: 14/547,417

(22) Filed: Nov. 19, 2014

(65) Prior Publication Data

US 2016/0139963 A1    May 19, 2016

(51) Int. Cl.
  *G06F 1/32* (2006.01)
  *G06F 9/50* (2006.01)
  *G06F 1/28* (2006.01)

(52) U.S. Cl.
  CPC .............. *G06F 9/5094* (2013.01); *G06F 1/28* (2013.01); *G06F 1/3206* (2013.01); *G06F 1/329* (2013.01);
  (Continued)

(58) Field of Classification Search
  CPC ......... G06F 9/50; G06F 1/3234; G06F 1/3203
  (Continued)

(56) References Cited

U.S. PATENT DOCUMENTS 7,007,183 B2    2/2006    Rawson, III
7,225,441 B2    5/2007    Kozuch et al.
(Continued)

FOREIGN PATENT DOCUMENTS

WO    2010136426 A1    12/2010

OTHER PUBLICATIONS

"i7-3770k vs. i7-2600K: Temperature, Voltage, GZz and Power-Consumption Analysis", Nov. 5, 2012, AnandTech Forums, pp. 1-21, Copyright © 2000-2014, vBulletin Solutions, Inc., <http://forums.anandtech.com/showthread.php?t=2281195>.
(Continued)

*Primary Examiner* — Jaweed A Abbaszadeh
*Assistant Examiner* — Volvick Derose
(74) *Attorney, Agent, or Firm* — Steven F. McDaniel; Jose A. Medina-Cruz

(57) ABSTRACT

As disclosed herein, a method, executed by a computer, includes comparing a current power consumption profile for a computing task with an historical power consumption profile, receiving a request for a computing resource, granting the request if the historical power consumption profile does not suggest a pending peak in the current power consumption profile or the historical power consumption profile indicates persistent consumption at a higher power level, and denying the request for the computing resource if the historical power consumption profile suggests a pending peak in the current power consumption profile and the historical power consumption profile indicates temporary consumption at the higher power level. Denying the request may include initiating an allocation timeout and subsequently ending the allocation timeout in response to a drop in a power consumption below a selected level. A computer system and computer program product corresponding to the method are also disclosed herein.

20 Claims, 5 Drawing Sheets

(52) U.S. Cl.
CPC .......... *G06F 1/3203* (2013.01); *G06F 1/3215* (2013.01); *Y02D 10/24* (2018.01)

(58) Field of Classification Search
USPC ....................................................... 713/323
See application file for complete search history.

(56) References Cited

U.S. PATENT DOCUMENTS

| | | | |
|---|---|---|---|
| 8,341,444 B2* | 12/2012 | Brown .................. | G06F 1/3203 713/323 |
| 8,370,836 B2 | 2/2013 | Shetty et al. | |
| 8,429,276 B1 | 4/2013 | Kumar et al. | |
| 8,627,123 B2 | 1/2014 | Jain et al. | |
| 2003/0065958 A1* | 4/2003 | Hansen .................. | G06F 1/26 713/300 |
| 2004/0098222 A1* | 5/2004 | Pehrsson .................. | H04M 1/72519 702/176 |
| 2006/0136761 A1* | 6/2006 | Frasier .................. | G06F 9/505 713/320 |
| 2006/0259621 A1* | 11/2006 | Ranganathan .......... | G06F 1/206 709/226 |
| 2007/0245162 A1* | 10/2007 | Loffink .................. | G06F 1/32 713/300 |
| 2008/0005593 A1* | 1/2008 | Wyatt .................. | G06F 1/3228 713/300 |
| 2008/0130728 A1* | 6/2008 | Burgan .................. | H04W 52/343 375/222 |
| 2008/0165714 A1* | 7/2008 | Dettinger .......... | H04W 52/0261 370/311 |
| 2008/0184230 A1* | 7/2008 | Leech .................. | G06F 9/505 718/100 |
| 2008/0189567 A1* | 8/2008 | Goodnow .............. | G06F 1/3203 713/340 |
| 2008/0301473 A1 | 12/2008 | Perez et al. | |
| 2009/0113221 A1* | 4/2009 | Holle .................. | G06F 1/189 713/310 |
| 2009/0121548 A1* | 5/2009 | Schindler .................. | H02J 1/14 307/39 |
| 2009/0164152 A1* | 6/2009 | Creus .................. | G06F 1/3203 702/63 |
| 2009/0193276 A1* | 7/2009 | Shetty .................. | G06F 1/3203 713/340 |
| 2009/0204826 A1 | 8/2009 | Cox et al. | |
| 2009/0319808 A1* | 12/2009 | Brundridge .............. | G06F 1/189 713/300 |
| 2011/0023028 A1 | 1/2011 | Nandagopal et al. | |
| 2011/0047552 A1* | 2/2011 | Mergen .................. | G06F 9/4893 718/102 |
| 2011/0055613 A1* | 3/2011 | Mandyam .......... | H04W 52/0258 713/340 |
| 2011/0055831 A1* | 3/2011 | Heller, Jr. ............. | G06F 9/5094 718/100 |
| 2011/0173109 A1* | 7/2011 | Synesiou .............. | G06Q 10/00 705/34 |
| 2001/0213997 | 9/2011 | Kansal et al. | |
| 2011/0298284 A1* | 12/2011 | Thomson .................. | H02J 3/14 307/40 |
| 2012/0072762 A1* | 3/2012 | Atchison .............. | G06F 9/5072 714/2 |
| 2012/0144222 A1* | 6/2012 | Ito .......................... | G06F 1/3234 713/340 |
| 2012/0210325 A1* | 8/2012 | de Lind van Wijngaarden .......... H04W 52/0258 718/103 | |
| 2012/0330473 A1* | 12/2012 | Meredith .................. | H02J 3/14 700/291 |
| 2013/0024868 A1* | 1/2013 | Jeong .................. | G06F 9/505 718/104 |
| 2013/0124814 A1* | 5/2013 | Carter .................. | G06F 1/3275 711/169 |
| 2013/0155073 A1* | 6/2013 | Khodorkovsky ......... | G06F 3/14 345/501 |
| 2013/0191662 A1* | 7/2013 | Ingrassia, Jr. ......... | G06F 1/3206 713/320 |
| 2013/0219400 A1* | 8/2013 | Mergen ................. | G06F 9/4893 718/102 |
| 2013/0227326 A1* | 8/2013 | Gwak .................... | G06F 1/3287 713/324 |
| 2013/0268779 A1* | 10/2013 | Hueston ................ | G06F 1/3206 713/300 |
| 2013/0311794 A1* | 11/2013 | Stewart ..................... | G06F 1/26 713/300 |
| 2014/0007122 A1* | 1/2014 | Udeshi ................... | G06F 9/4893 718/103 |
| 2014/0025810 A1* | 1/2014 | Ghemawat .......... | G06F 11/3024 709/224 |
| 2014/0052503 A1* | 2/2014 | Zaloom ............. | G06Q 10/06393 705/7.39 |
| 2014/0052965 A1* | 2/2014 | Sarel ........................ | G06F 1/329 712/214 |
| 2014/0062340 A1* | 3/2014 | Elgayyar ............. | H05B 37/0245 315/360 |
| 2014/0068282 A1* | 3/2014 | Jenne .................... | G06F 1/3234 713/300 |
| 2014/0189405 A1* | 7/2014 | Conrad .................. | G06F 1/3203 713/323 |
| 2014/0196050 A1* | 7/2014 | Yu .......................... | G06F 9/5088 718/104 |
| 2014/0201556 A1* | 7/2014 | Attar .................. | H04W 52/0245 713/340 |
| 2014/0237274 A1* | 8/2014 | Murakami ............. | G06F 1/3243 713/320 |
| 2014/0282540 A1* | 9/2014 | Bonnet ................ | G06F 9/45558 718/1 |
| 2014/0298114 A1* | 10/2014 | Aoki .................... | G06F 11/2028 714/48 |
| 2014/0316958 A1* | 10/2014 | Alberth, Jr. ............. | G06Q 10/00 705/35 |
| 2014/0317422 A1* | 10/2014 | Rosenzweig ......... | G06F 1/3206 713/300 |
| 2014/0380338 A1* | 12/2014 | Makovsky ............... | G06F 9/542 719/318 |
| 2015/0113309 A1* | 4/2015 | Grieco ................ | G06F 11/3062 713/340 |
| 2015/0220127 A1* | 8/2015 | Kukoyi ............. | H04W 52/0258 713/340 |
| 2016/0070327 A1* | 3/2016 | Nemani .................. | G06F 1/324 713/300 |
| 2016/0077570 A1* | 3/2016 | Varadarajan ............ | H02J 9/002 713/322 |

OTHER PUBLICATIONS

"Lower Power Embedded Memory Solutions", © 2014 ChipStart LLC, p. 1, <http://www.chip-start.com/memory-solutions/low-power-memory/>.
Kazmi, "Minimizing PCI Express® Power Consumption", PCI Express, Copyright © 2007, PCI-SIG, pp. 1-25, <http://www.pcisig.com/developers/main/training_materials/get_document?doc_id=3ba5129826fa0214e5cd85fb70ff38e1df32a11c>.
"A 4.1 GHz Dual Core at $130—Can it be True?", Tom's Hardware, May 10, 2006, pp. 1-5, <http://www.tomshardware.com/reviews/dual-41-ghz-cores,1253-14.html>.
Stoess et al., "Energy Management for Hypervisor-Based Virtual Machines", Apr. 10, 2007, <http://static.usenix.org/event/usenix07/tech/full_papers/stoess/stoess_html/energy_mgmt_vms.html>.
Urgaonkar, et al., "Dynamic Resource Allocation and Power Management in Virtualized Data Centers", 2010 IEEE/IFIP Network Operations and Management Symposium—NOMS 2010, pp. 479-486, © 2010 IEEE.

* cited by examiner

VIRTUAL COMPUTING POWER MANAGEMENT

BACKGROUND OF THE INVENTION

The present invention relates generally to the field of resource allocation in computing systems, and more particularly to managing power in such systems.

In system virtualization, multiple virtual computing systems are created within a single physical computing system. The physical system can be a stand-alone computer, or alternatively, a computing system utilizing clustered computers and components. Virtual systems are independent operating environments that use virtual resources made up of logical divisions of physical resources such as processors, memory, and input/output (I/O) adapters. System virtualization is implemented through some managing functionality, typically hypervisor technology. Hypervisors, also called virtual machine managers (VMMs), use software or firmware to achieve fine-grained, dynamic resource sharing. Hypervisors are the primary technology for system virtualization because they provide the greatest level of flexibility in how virtual resources are defined and managed.

Hypervisors provide the ability to divide physical computing system resources into isolated logical partitions. Each logical partition operates like an independent computing system running its own operating system (e.g., a virtual system). Operating systems running in a virtualized environment are often referred to as "guest machines." Exemplary operating systems include AIX®, IBM® i, Linux®, and the virtual I/O server (VIOS). Hypervisors can allocate dedicated processors, I/O adapters, and memory to each logical partition and can also allocate shared processors to each logical partition. Unbeknownst to the logical partitions, the hypervisor creates a shared processor pool from which the hypervisor allocates virtual processors to the logical partitions as needed. In other words, the hypervisor creates virtual processors from physical processors so that logical partitions can share the physical processors while running independent operating environments.

The hypervisor can also dynamically allocate and de-allocate dedicated or shared resources (such as processors, I/O, and memory) across logical partitions while the partitions are actively in use. This is known as dynamic logical partitioning (dynamic LPAR) and enables the hypervisor to dynamically redefine all available system resources to reach optimum capacity for each partition.

One aspect of dynamic resource allocation that is often ignored is power consumption. Although power consumption tends to correlate with the amount and type of allocated resources spikes in power consumption may come at unexpected times. Such spikes require computing systems to have larger power supplies and may increase utility bills which are often based on peak usage. The ability to better control power consumption spikes would be an advancement in the art.

SUMMARY

As disclosed herein, a method, executed by a computer, includes comparing a current power consumption profile for a computing task with an historical power consumption profile for the computing task, receiving a request for a computing resource, granting the request for the computing resource if the historical power consumption profile does not suggest a pending peak in the current power consumption profile or the historical power consumption profile indicates persistent consumption at a higher power level, and denying the request for the computing resource if the historical power consumption profile suggests a pending peak in the current power consumption profile and the historical power consumption profile indicates temporary consumption at the higher power level. Denying the request for the computing resource may include initiating an allocation timeout and subsequently ending the allocation timeout in response to a drop in a power consumption below a selected level. The method provides improved power management. A computer system and computer program product corresponding to the method are also disclosed herein.

DETAILED DESCRIPTION

The embodiments disclosed herein provide improved power management in a computing system by dynamically controlling the allocation of resources.

Figure 1:
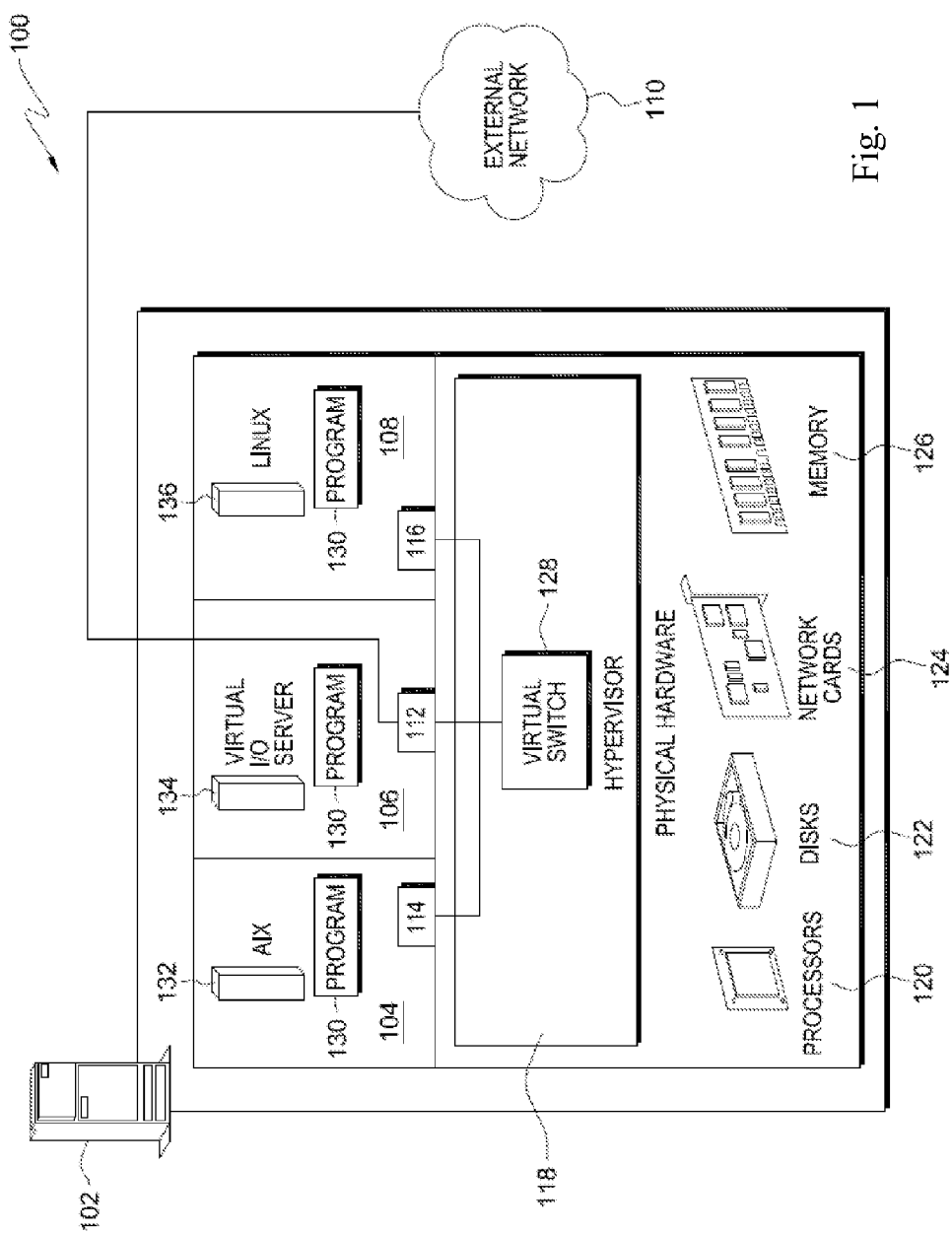
FIG. 1 is a functional block diagram of one embodiment of a virtualized computer environment in which at least some of the embodiments disclosed herein may be deployed.

FIG. 1 is a functional block diagram of one embodiment of a virtualized computer environment 100 in which at least some of the embodiments disclosed herein may be deployed. Virtualized computer environment 100 includes computer 102. Computer 102 has been divided into multiple logical partitions 104, 106, and 108. In the illustrated example, each of the respective logical partitions 104, 106, and 108 runs an independent operating environment, such as an OS. Logical partition 104 runs an OS 132, which can be AIX®, logical partition 106 (hereafter VIOS partition 106) runs a VIOS 134, and logical partition 108 runs an OS 136, which can be Linux®. Other operating environments and combinations of operating environments may be used. In another embodiment, any number of partitions may be created and may exist on separate physical computers of a clustered computer system.

Communications from external network 110 may be routed through Shared Ethernet adapter (SEA) 112 on VIOS partition 106 to virtual adapters 114 and 116 on respective logical partitions 104 and 108. Communications from virtual adapters 114 and 116 on respective logical partitions 104 and 108 may be routed through Shared Ethernet adapter (SEA) 112 on VIOS partition 106 to external network 110. In an alternative embodiment, physical network adapters may be allocated to logical partitions 104, 106, and 108.

Hypervisor 118 forms logical partitions 104, 106 and 108 from the physical computing resources of computer 102 through logical sharing of designated physical computing resources (or portions thereof) such as processors 120, storage disks 122, I/O adapters 124 (e.g., network interface cards), and/or memory 126. Hypervisor 118 performs standard operating system functions and manages communications between logical partitions 104, 106, and 108 via virtual switch 128.

Logical partitions 104, 106, and 108 each include various programs or tasks 130 and various physical resources such as processors 120, disks 122, I/O adapters 124, and memory 126. The hypervisor 118 allocates all or a portion of the physical resources (e.g., a portion of the available bandwidth) to one or more programs 130 which may be executing in different logical partitions. The present invention may be leveraged by the hypervisor 118 in order to control power consumption within the virtualized computer environment 100.

Figure 2:
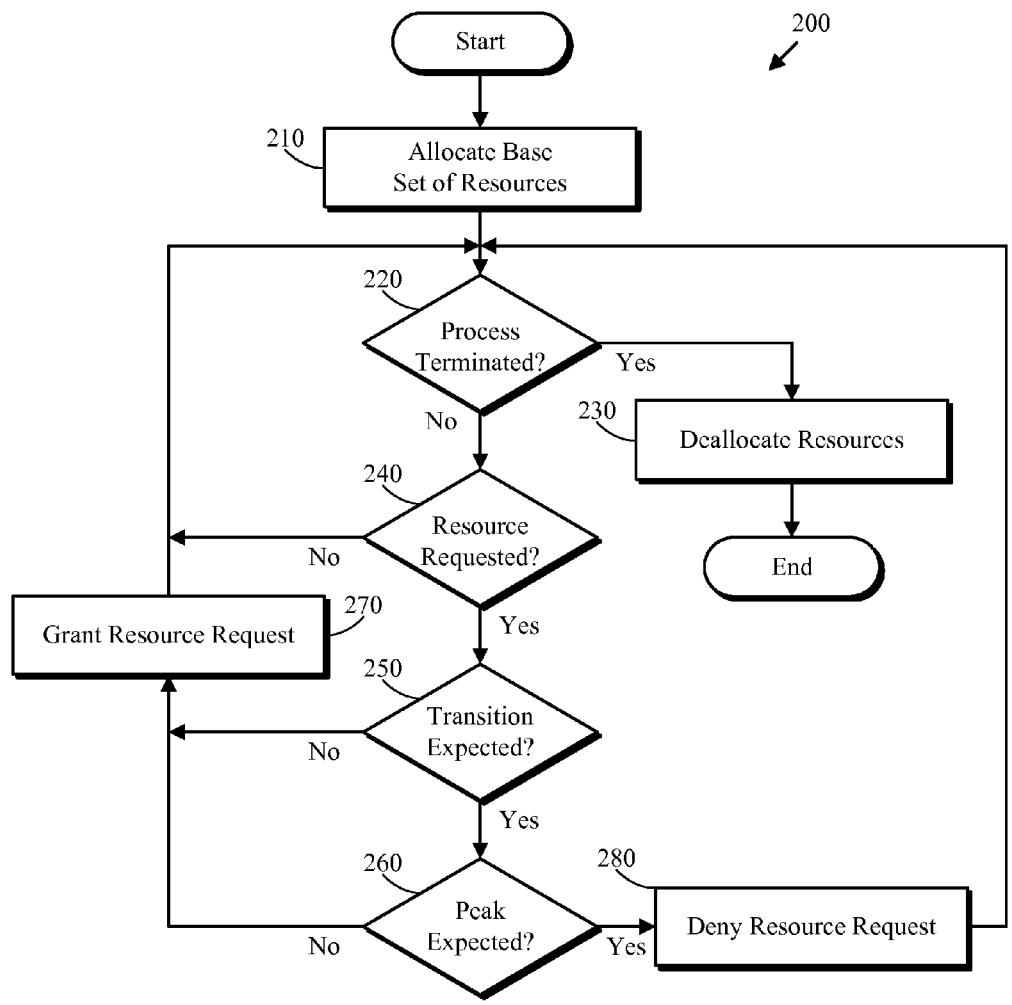
FIG. 2 is a flowchart depicting one embodiment of a resource management method.

FIG. 2 is a flowchart depicting one embodiment of a resource management method 200. As depicted, the resource management method 200 includes allocating (210) a base set of resources, determining (220) whether a process should be terminated, de-allocating (230) one or more resources, determining (240) whether a resource has been requested, determining (250) whether a power transition is expected, determining (260) whether a power consumption peak is expected, granting (270) a resource request, and denying (280) the resource request. The resource management method 200 provides power consumption management by controlling resource allocation in a computing system or environment such as the virtualized computer environment 100. One skilled in the art will appreciate that, for the purpose of simplicity, the method 200 is presented as a single polling process with a number of conditional tests. However, the method 200 may be implemented (perhaps preferably) as an event driven process or set of processes.

Allocating (210) a base set of resources may include reserving a predetermined set of resources. In some embodiments, the predetermined set of resources is a minimal set of resources required to enable execution of a process or task (which could involve multiple processes). For example, a processor 120 or a portion of the CPU time of the processor 120 along with some memory 126 may be required to begin execution. Additional resources may be allocated on demand.

Determining (220) whether a process should be terminated may include determining whether the process has completed execution of the program associated with the process or determining if a kill signal or some other termination mechanism has been activated that references the process. If the process should not be terminated, the method proceeds to de-allocating (230) one or more resources. If the process should be terminated, the method proceeds to determining (240) whether a resource has been requested. De-allocating (230) one or more resources may include de-allocating all of the resources assigned to a process that is to be terminated. Subsequent to de-allocating, the method terminates.

Determining (240) whether a resource has been requested may include checking an event flag or accessing some other signaling mechanism. Alternately, a resource request may be an event driven occurrence. If a resource has not been requested, the depicted method loops to the determining step 220. If a resource has been requested, the depicted method proceeds to the determining operation 250.

Determining (250) whether a power transition is expected may include checking a historical power consumption profile to ascertain whether an increase in power consumption is expected. The historical power consumption profile (as well as a current power consumption profile) may be estimated from resource utilization information or collected from repeated direct measurements of power consumption.

In some embodiments, power consumption is divided into discreet levels that have an upper and lower threshold. The discreet levels may correspond to resource granularity. In other embodiments, relative changes in power consumption are quantized rather than absolute levels. Consequently, determining (250) whether a power transition is expected may include ascertaining if an expected transition to a higher power consumption level (absolute or relative) is imminent. If a transition is expected, the method advances to the granting operation 270. If a transition is not expected, the method continues by determining (260) whether a power consumption peak is expected.

Determining (260) whether a power consumption peak is expected may include checking the historical power consumption profile or markers associated therewith to ascertain whether a peak in power consumption is expected. If a peak is expected, the method advances by denying (280) the resource request. If a peak is not expected, the method continues by granting (270) the resource request.

Figure 3A:
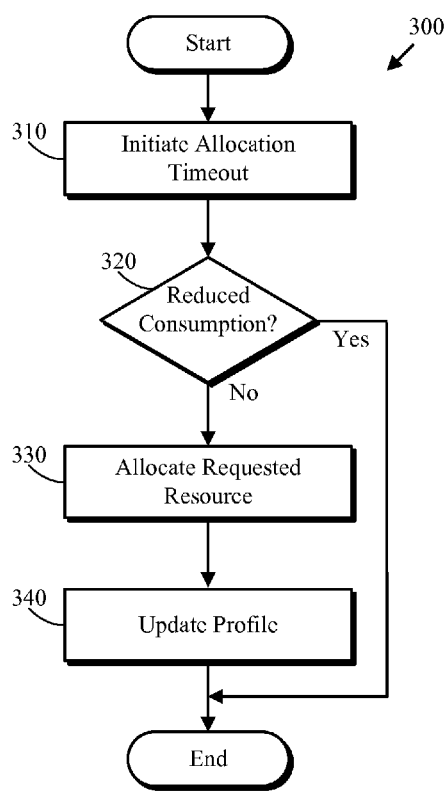
FIG. 3a is a flowchart depicting one embodiment of a resource throttling method.
Figure 3B:
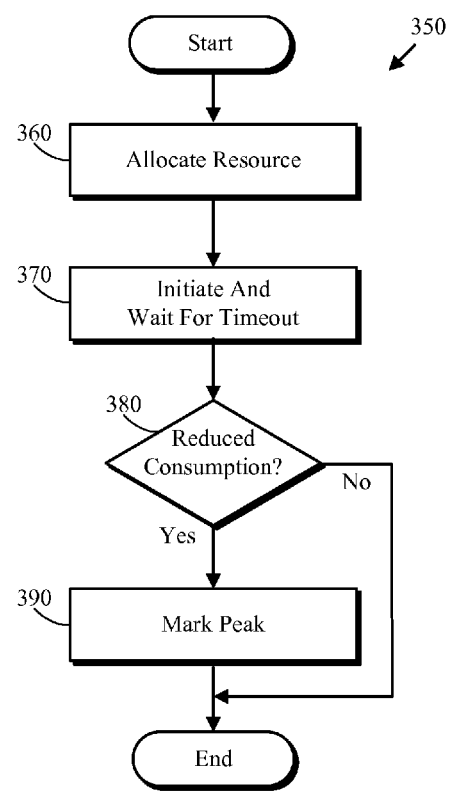
FIG. 3b is a flowchart depicting one embodiment of a resource allocation method.

Granting (270) a resource request may include conducting the method of FIG. 3*b*. Denying (280) the resource request may include conducting the method of FIG. 3*a*. In some embodiments, denial of the resource request is temporary.

FIG. 3*a* is a flowchart depicting one embodiment of a resource throttling method 300. As depicted, the resource throttling method 300 includes initiating (310) an allocation timeout, determining (320) whether power consumption has been reduced, allocating (330) a requested resource, and updating (340) a power consumption profile. The resource throttling method 300 may be used to implement the deny resource operation 280 within the resource management method 200.

Initiating (310) an allocation timeout may include setting a status flag or the like for the process or the requested resource indicating that allocation of the requested resource or all resources are to be delayed. In some embodiments, a timer is set that determines the duration of the allocation timeout.

Subsequent to initiating (310) an allocation timeout (either immediately or after a selected wait time) the method continues by determining (320) whether power consumption has been reduced (e.g. as a consequence of initiating the allocation timeout). In some embodiments, power consumption (or the change in power consumption) is compared to a specific threshold. If power consumption has been reduced the method terminates. If power consumption has not been reduced, the method 300 advances to allocating (330) the requested resource.

Allocating (330) a requested resource may include a standard resource allocation process that is well known to those skilled in the art. One skilled in the art may appreciate that the allocating operation (330) may be conducted when it becomes apparent that initiating (310) an allocation timeout is not effective in reducing power consumption below the selected threshold level (e.g., the minimum value for a particular power consumption level) and the increase in power consumption is likely to be sustained. Consequently, a particular historical power consumption profile that indicated a peak in power consumption may no longer be accurate for the computing task. In recognition of this situation, the method continues by updating (340) the power consumption profile.

Updating (340) the power consumption profile may include copying a current power consumption profile to the historical power consumption profile. Subsequent to updating (340) the power consumption profile, the method 300 ends.

FIG. 3b is a flowchart depicting one embodiment of a resource allocation method 350. As depicted, the resource allocation method 350 includes allocating (360) a requested resource, initiating and waiting (370) for a timeout, determining (380) whether power consumption has been reduced, and marking (390) a peak in the power consumption. The resource allocation method 300 may be used to implement the grant resource operation 270 within the resource management method 200.

Allocating (360) a requested resource may include conducting a standard resource allocation process that is well known to those skilled in the art. Initiating and waiting (370) for a timeout may include setting a timer to elapse, or timing event to trigger, at a selected time. Determining (380) whether power consumption has been reduced may include comparing a current power consumption level with a previous power consumption level. One skilled in the art will recognize that the determining operation 380 may be essentially identical to the determining operation 320. Marking (390) a peak in power consumption may include annotating a data structure or table to indicate that a specific point in a power consumption profile is a peak.

Figure 4A:
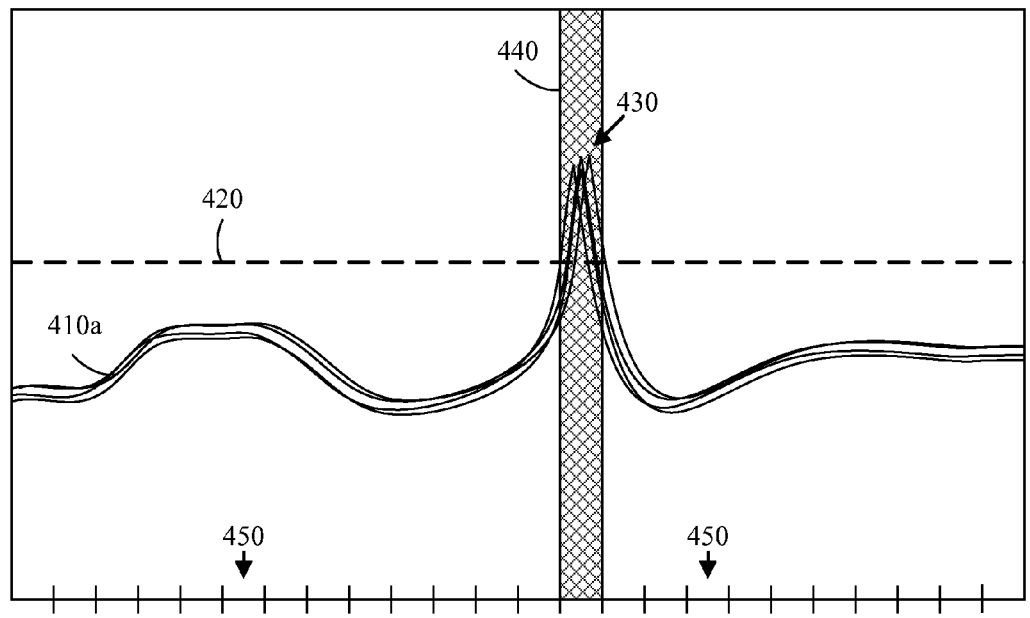
FIGS. 4a and 4b are graphs depicting the effect of the present invention on power consumption profiles.
Figure 4B:
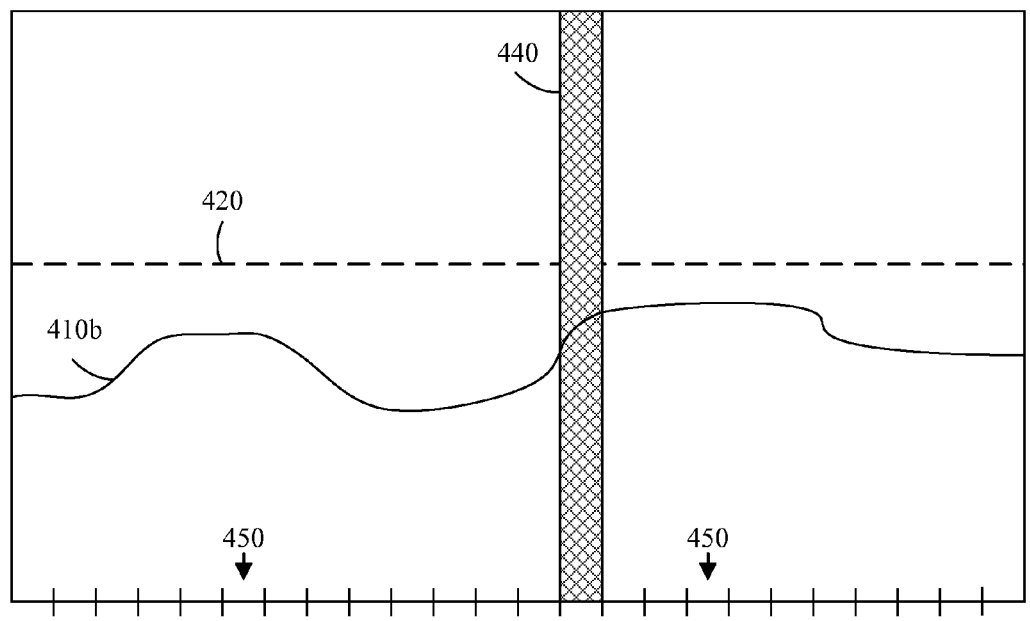

FIGS. 4a and 4b are graphs depicting the effect of some embodiments of the present invention on power consumption profiles. As shown in FIG. 4a, one or more historical power consumption profiles 410a, indicate that the consumed power for a computing task temporarily exceeds a threshold 420, resulting in one or more peaks 430. Each power consumption profile 410a may correspond to an occurrence or instance of executing the computing task. In the depicted embodiment, the power consumption profiles 410a represent the consumed power (vertical axis) tracked over the execution time (horizontal axis) of the task.

In some embodiments, tracking the consumed power includes determining a minimum, maximum, and average value for the consumed power within quantized time intervals 450. Power consumption peaks 430 may be detected and marked resulting in a marked interval 440 for a computing task. Subsequent to detecting and marking peaks 430, resource allocation for a new instance of the computing task may deny or defer allocation of computing resources near the marked interval 440 resulting in a current power consumption profile 410b (see FIG. 4b) that does not exceed the threshold 420.

Figure 5:
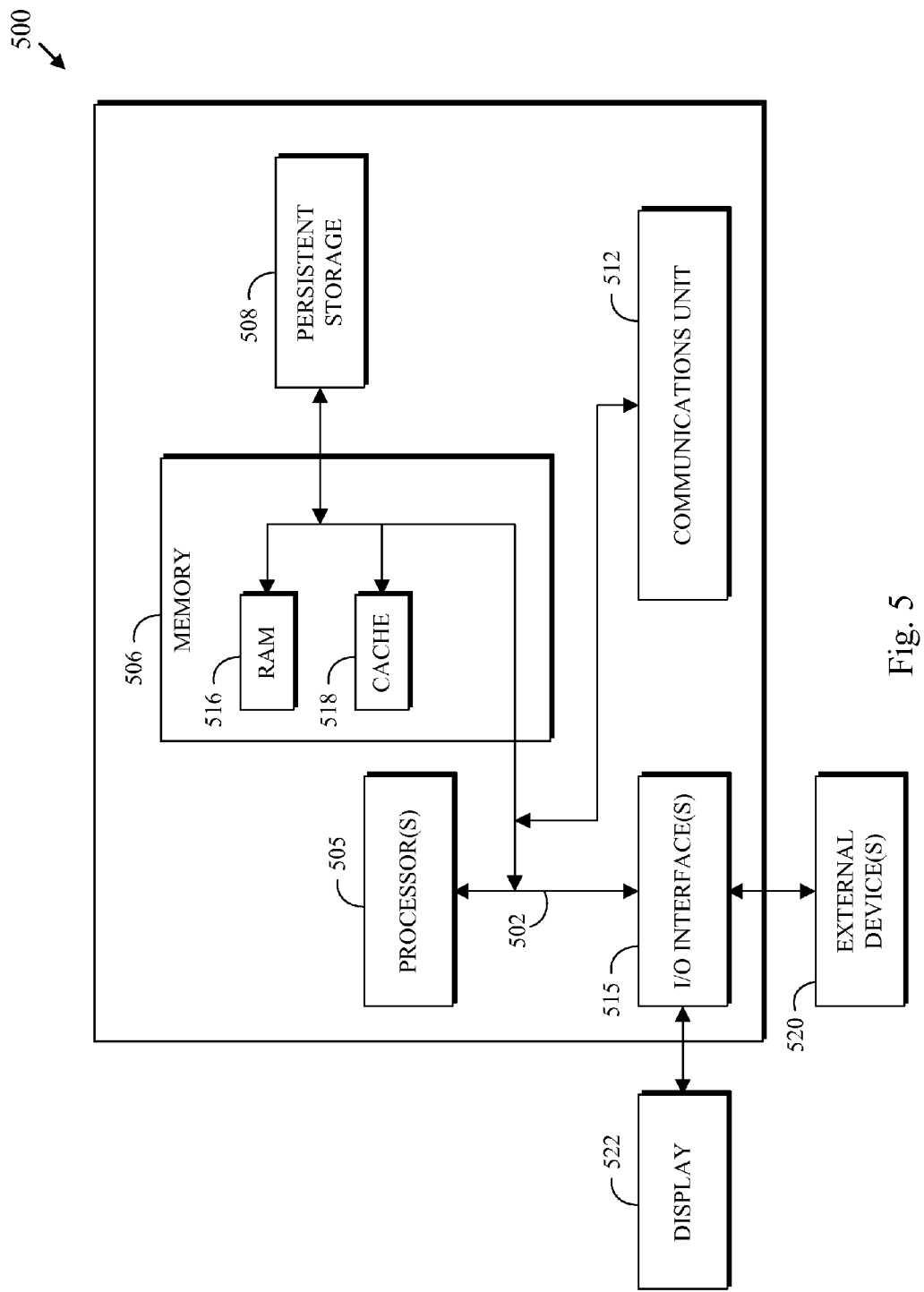
FIG. 5 is a block diagram depicting one example of a computing apparatus (i.e., computer) suitable for executing the methods disclosed herein.

FIG. 5 is a block diagram depicting components of a computer 500 suitable for executing the methods disclosed herein. The computer 500 may be one embodiment of the data processor 102 depicted in FIG. 1. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving a request for a computing resource for a computing task, wherein the computing task is active in a computing system, and wherein the computing system includes a current power consumption profile for the computing task and a historical power consumption profile for the computing task;
   determining whether a peak in a current power consumption profile is expected based on the historical power consumption profile for the computing task; and
   responsive to determining a peak is expected, delaying the request for the computing resource by: (i) initiating an allocation timeout, (ii) determining whether the allocation timeout is effective in reducing the current power consumption profile, (iii) responsive to determining the allocation timeout is not effective in reducing the current power consumption profile, granting the request for the computing resource, and (iv) updating the historical power consumption profile.

2. The computer-implemented method of claim 1, further comprising ending the allocation timeout in response to a drop in a power consumption below a selected level.

3. The computer-implemented method of claim 1, further comprising allocating a minimal set of computing resources to a plurality of computing tasks.

4. The computer-implemented method of claim 1, further comprising determining a plurality of power level thresholds.

5. The computer-implemented method of claim 1, wherein the current power consumption profile and the historical power consumption profile are estimated from resource utilization information.

6. The computer-implemented method of claim 1, wherein the current power consumption profile is generated by repeated measurement.

7. The computer-implemented method of claim 1, wherein the computing resource is selected from the group consisting of processor utilization, memory, memory bandwidth, an I/O device, and I/O bandwidth.

8. A computer program product comprising:
one or more computer readable storage media; and
program instructions stored on the one or more computer readable storage media, the program instructions comprising:
program instructions to receive a request for a computing resource for a computing task, wherein the computing task is active in a computing system, and wherein the computing system includes a current power consumption profile for the computing task and a historical power consumption profile for the computing task;
program instructions to determine whether a peak in a current power consumption profile is expected based on the historical power consumption profile for the computing task; and
program instructions to responsive to determine a peak is expected, delaying the request for the computing resource by: (i) initiating an allocation timeout, (ii) determining whether the allocation timeout is effective in reducing the current power consumption profile, (iii) responsive to determining the allocation timeout is not effective in reducing the current power consumption profile, granting the request for the computing resource, and (iv) updating the historical power consumption profile.

9. The computer program product of claim 8, further comprising program instructions to end the allocation timeout in response to a drop in a power consumption below a selected level.

10. The computer program product of claim 8, further comprising program instructions to allocate a minimal set of computing resources to a plurality of computing tasks.

11. The computer program product of claim 8, further comprising program instructions to determine a plurality of power level thresholds.

12. The computer program product of claim 8, wherein the current power consumption profile and the historical power consumption profile is estimated from resource utilization information.

13. The computer program product of claim 8, wherein the current power consumption profile is generated by repeated measurement.

14. The computer program product of claim 8, wherein the computing resource is selected from processor utilization, memory, memory bandwidth, an I/O device, and I/O bandwidth.

15. A computer system comprising:
one or more computer processors;
one or more computer readable media; and
program instructions, stored on the one or more computer readable media for execution by at least one of the one or more processors, the program instructions comprising:
program instructions to receive a request for a computing resource for a computing task, wherein the computing task is active in a computing system, and wherein the computing system includes a current power consumption profile for the computing task and a historical power consumption profile for the computing task;
program instructions to determine whether a peak in a current power consumption profile is expected based on the historical power consumption profile for the computing task; and
program instructions to responsive to determine a peak is expected, delaying the request for the computing resource by: (i) initiating an allocation timeout, (ii) determining whether the allocation timeout is effective in reducing the current power consumption profile, (iii) responsive to determining the allocation timeout is not effective in reducing the current power consumption profile, granting the request for the computing resource, and (iv) updating the historical power consumption profile.

16. The computer system of claim 15, further comprising program instructions to end the allocation timeout in response to a drop in a power consumption below a selected level.

17. The computer system of claim 15, further comprising program instructions to allocate a minimal set of computing resources to a plurality of computing tasks.

18. The computer system of claim 15, further comprising program instructions to determine a plurality of power level thresholds.

19. The computer system of claim 15, wherein the current power consumption profile and the historical power consumption profile is estimated from resource utilization information.

20. The computer system of claim 15, wherein the current power consumption profile is generated by repeated measurement.

* * * * *